Aug. 26, 1969
J. GELB
3,463,020
REVERSING DRIVE MECHANISM
Filed Nov. 17, 1966
2 Sheets-Sheet 1
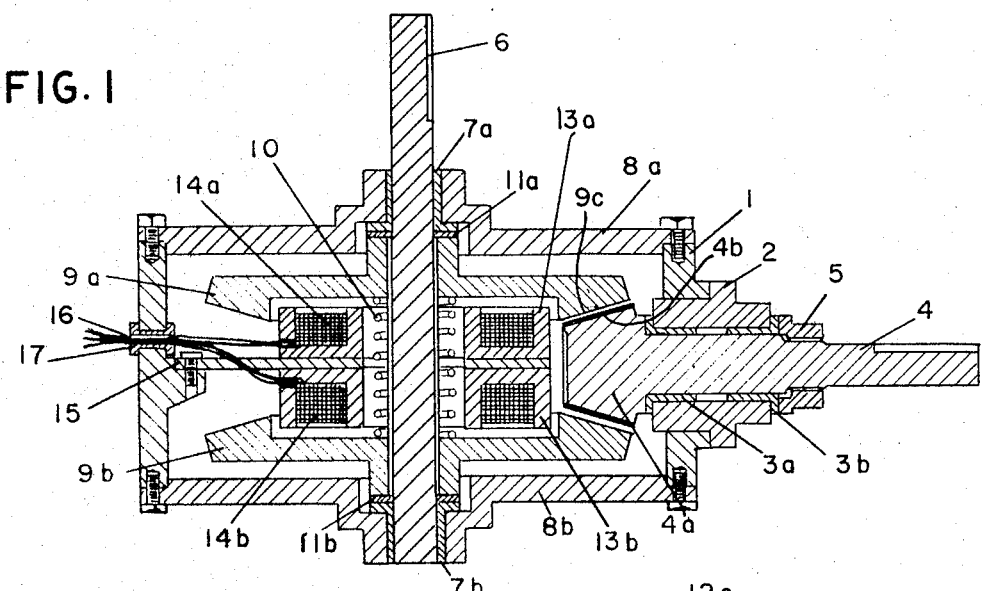
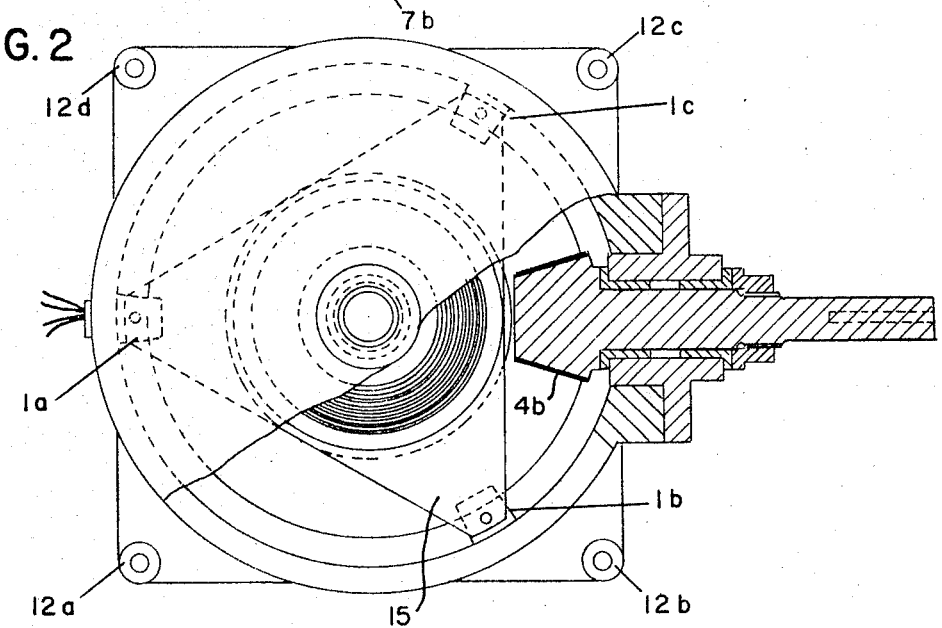
John Gelb.
INVENTOR Aug. 26, 1969    J. GELB    3,463,020
REVERSING DRIVE MECHANISM
Filed Nov. 17, 1966    2 Sheets-Sheet 2
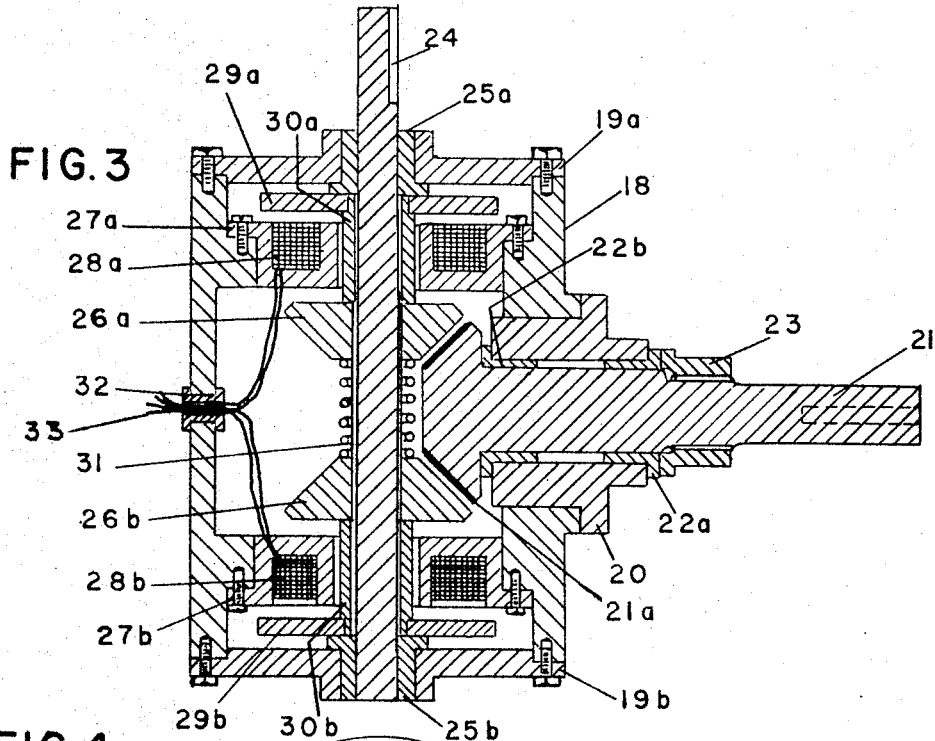
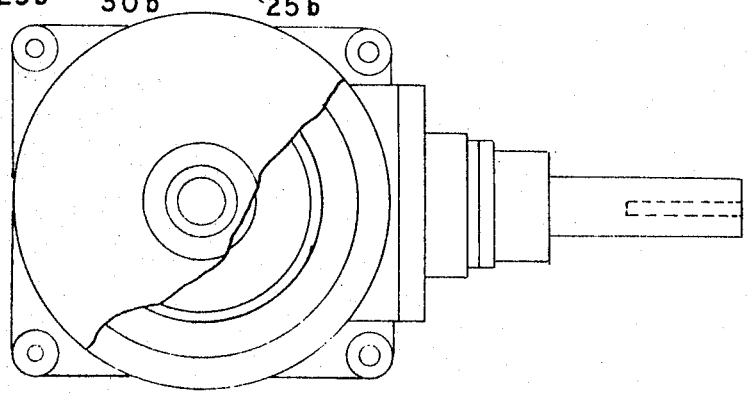
John Gelb
INVENTOR United States Patent Office 3,463,020
Patented Aug. 26, 1969

3,463,020
REVERSING DRIVE MECHANISM
John Gelb, Van Nuys, Calif., assignor, by direct and mesne assignments, of forty-five percent to Allan Friedman and ten percent to Marvin Friedman, both of Los Angeles, Calif.
Filed Nov. 17, 1966, Ser. No. 595,250
Int. Cl. F16h 13/12, 3/14, 55/34
U.S. Cl. 74—202                                    4 Claims

ABSTRACT OF THE DISCLOSURE

A reversing drive mechanism enabling an output shaft to be selectively coupled to a constantly revolving input shaft and to impart to the output shaft either clockwise or counterclockwise rotation. In the de-energized state the output shaft is not rotatably connected to the revolving input shaft. Selective actuation of the output shaft is achieved by selectively actuating a pair of electromagnets. Output shaft rotation and torque transfer is achieved by frictional engagement of frictional drive components.

---

This invention relates to a novel and useful mechanism to selectively actuate and reverse the direction of rotation of an output shaft, without affecting the direction of rotation of the input shaft. With the increased emphasis on the application of automation in mechanical devices and various machinery and the resulting use of servo and programmed controls, drive gears, leadscrew and similar type machine elements are more frequently required to change their sense of rotation as a result of electrical signals. To this end a simple foolproof reversing drive is required. Since rapid sequence, reversing of electrical motors is contrary to accepted engineering practice, due to high temperature rise of the drive motor and associated thermal and mechanical problems, a device is needed by industry which provides in a simple functional assembly, a mechanism for reversing an output shaft, without changing direction of rotation of the input shaft. These requirements have been met by the invention described hereunder. An additional feature of this device is the fact that in a de-energized state no rotating motion is imparted ot the output shaft, therefore this mechanism not only serves as a reversing means but also as a clutch between the input and the output shaft. It is an object of this invention to provide a simple, rugged mechanism to achieve the aforementioned functions.

Other objects, advantages and novel features of the invention will become apparent from the following detailed description of the invention when considered in conjunction with the accompanying drawings wherein:

FIGURE 1 is a sectional view of one embodiment of the present invention;

FIGURE 2 is an end view, partly in section, of FIGURE 1;

FIGURE 3 is a sectional view of another embodiment of the present invention; and FIGURE 4 is an end view of FIGURE 3.

Referring to FIGURES 1 and 2, the reversing mechanism of the present invention comprises a main housing 1, with a straight through bore, carries on its outside a flange for mounting the pinion bearing carrier 2. This pinion bearing carrier 2 is fitted with two bearings 3a and 3b on which drive pinion 4 revolves. A thrust and end play adjusting nut 5 is mounted on a threaded section of the pinion 4 to provide for end play and thrust adjustment. This whole assembly is bolted through the bore of the main housing 1 to a flange. To the tapered pinion section 4a of the pinion 4 is bonded a resilient, high friction material 4b such as polyurethane or the like. An output shaft 6 is mounted in bearings 7a and 7b. These bearings are located in housing covers 8a and 8b which are fastened to the main housing 1. The output shaft 6 carries on its center section a splined portion which slidingly engages the splined hub of the two drive disks 9a and 9b. These disks 9a and 9b, made of a material compatible with their function as an armature in an operational relationship with the actuating electromagnets, posses an outer rim surface of the same angularity as tapered pinion section 4a. A spring 10 located around the shaft 6 forces the drive disks 9a and 9b toward the thrust washers 11a and 11b and in turn against the flanges of the stationary bearings 7a and 7b, pressed into covers 8a and 8b. Thus the drive disks 9a and 9b are normally out of frictional engagement with the drive pinion 4. Two electromagnets located coaxially with the output shaft 6, have their effective magnetic gap oriented toward the adjacent drive disks 9a and 9b, respectively. These electromagnets, consisting of U section type pole rings 13a and 13b and each containing a wire-wound coil 14a and 14b, are riveted or otherwise fastened to a spidershaped structural member 15 that is fabricated from a nonmagnetic material. This spider shaped member 15 in turn is rigidly attached to three projections of the main housing 1a, 1b and 1c, thus holding the electromagnet assembly stationary in relation to the output shaft 6 and the drive disks 9a and 9b. The lead 16, used to conduct electricity for energizing these electromagnets, are therefore stationary and are brought out of the main housing 1 through a strain relief bushing 17.

FIG. 2 depicts a fragmented bottom view of the reversing mechanism, illustrating particularly the technique employed attaching electromagnet supporting spider shaped member 15 by means of projections 1a, 1b and 1c to the main housing 1. Mounting bosses 12a, 12b, 12c and 12d of main housing 1 are also shown in this view.

In operation this mechanism functions as follows: The drive pinion 4 is driven by a constantly revolving electric motor or other source of rotational power. The output shaft 6, coupled to the device driven, is stationary until either the upper or lower electromagnet assembly 13a, 13b, 14a and 14b is energized. Upon energizing one of the electromagnets, an electromagnetic field is produced in the operating magnetic gap of the electromagnet, thereby attracting the adjacent drive disk 9a or 9b, which now slides along the splined section of the output shaft 6 against the action of the spring 10, toward the active magnetic gap of the electromagnet. As the drive disk 9a or 9b slides along the output shaft 6 toward the pole gap, its tapered rim 9c engages the high friction material 4b bonded on tapered pinion section 4a of the rotating pinion and rotating motion is imparted to the drive disk 9a or 9b, which now transfers this rotary motion to the shaft 6 and effects rotation of the driven device. Assuming that drive pinion 4 is rotating in the clockwise direction, for example, when coil 14a is activated then upper drive disk 9a will engage pinion 4 and will rotate output shaft 6 in the clockwise direction. However, with drive pinion 4 still rotating in the clockwise direction, when coil 14b is activated then lower drive disk 9b will engage pinion 4 and will rotate output shaft 6 in the counterclockwise direction. In FIGURES 3 and 4 is illustrated another embodiment of the present invention. In this embodiment the ratio between the input and output drives is 1 to 1 which precludes an electromagnet arrangement as described previously. Since in this configuration there is not enough space between the drive cones 26a and 26b, the electromagnets are located coaxially with the output shaft 24, but with their operative magnetic gap oriented toward the output shaft bearings 25a and 25b, located in the main housing covers 19a and 19b. Sleeves 30a and 30b, made of nonmagnetic material, are rigidly connected to iron armature plates 29a and 29b, respectively.

This assembly is normally held away from the electromagnet pole ring 27a and 27b by abutting against the drive cones 26a and 26b which in turn are spring loaded out of engagement with the drive pinion 21, having high friction material 21a bonded on the tapered pinion section, by the spring 31.

FIG. 4 depicts a fragmented bottom view of the device showing the overall outline and housing mounting bosses.

In operation, the mechanism shown in FIGURES 3 and 4 functions as follows: The drive pinion 21 is driven by a constantly revolving power source. The output shaft 24, connected to the mechanism to be driven, is stationary until either the upper or lower electromagnet is energized. Upon energization, either of the two electromagnets produces an electromagnetic field in the operating gap, thereby attracting the iron armature plate 29a or 29b that are respectively rigidly connected to the sleeve 30a and 30b. Since the sleeves abut against their adjoining drive cone 28a and 28b, magnetic attraction of either armature 29a or 29b by the respective electromagnets moves drive cone 26a or 26b along the splined output shaft 24 towards frictional engagement with the revolving drive pinion 21. Rotation of the drive pinion 21 is now transmitted to the drive cone 26a or 26b and thereby to the output shaft 24. Depending upon which of the two electromagnets is energized, the appropriate cone is brought in frictional contact with the drive pinion and thereby either clockwise or counterclockwise rotation of the output shaft is obtained.

What I claim is:
1. A reversing drive mechanism comprisnig:
   a housing;
   an output shaft extending through said housing with the center section thereof within said housing and the ends thereof rotatably mounted in first and second bearings respectively at first and second ends of said housing;
   an input shaft rotatably mounted at the side of said housing with the axis thereof perpendicular to the axis of the center section of said output shaft;
   a pinion rigidly connected to the end of said input shaft and positioned within said housing;
   said pinion having a beveled surface;
   said beveled surface coated with a high friction material;
   a first drive cone slidably splined on the center section of said output shaft;
   a second drive cone slidably splined on the center section of said output shaft;
   a spring mounted on the center section of said output shaft between said first and second drive cones to bias said first and second drive cones away from each other;
   a first armature plate having a cylindrical extension slidably mounted on the center section of said output shaft with the end of said cylindrical extension abutting said first drive cone and the armature being adjacent said first end of said housing;
   a second armature plate having a cylindrical extension slidably mounted on the center section of said output shaft with the end of said cylindrical extension abutting said second drive cone and the armature being adjacent said second end of said housing;
   a first electromagnet rigidly attached to said housing and surrounding said cylindrical extension of said first armature plate and magnetically in operable relation with said first armature plate; and
   a second electromagnet rigidly attached to said housing and surrounding said cylindrical extension of said second armature plate and magnetically in operable relation with said second armature plate.
   magnetically in operable relation with said second armature plate.

2. The device of claim 1 wherein:
   said first electromagnet is toroidal in shape and has an opening that surrounds and is spaced from said cylindrical extension of said first armature plate; and
   said second electromagnet is torodial in shape and has an opening that surrounds and is spaced from said cylindrical extension of said second armature plate.

3. The device of claim 2 wherein:
   said first electromagnet has a coil that is adjacent to said first armature plate; and
   said second electromagnet has a coil that is adjacent to said second armature plate.

4. The device of claim 2 wherein:
   said first armature plate abuts said first bearing; and
   said second armature plate abuts said second bearing.

References Cited

UNITED STATES PATENTS

| | | | |
|---|---|---|---|
| 511,821 | 1/1894 | Trunpy | 74—210 XR |
| 3,168,773 | 2/1965 | Frye | 74—215 XR |
| 1,038,131 | 9/1912 | Hemming | 74—202 |
| 1,424,027 | 7/1922 | Murphy | 74—202 |
| 1,430,019 | 9/1922 | Lillibridge | 74—202 |
| 2,525,443 | 10/1950 | Bischoff | 74—202 |
| 2,618,161 | 11/1952 | Mason | 74—202 |
| 2,941,414 | 6/1960 | Lee | 192—51 |

FRED C. MATTERN, JR., Primary Examiner

J. A. WONG, Assistant Examiner

U.S. Cl. X.R.
74—210, 215, 379; 192—51, 84